US012688058B2

(12) United States Patent
Yerli

(10) Patent No.: US 12,688,058 B2
(45) Date of Patent: *Jul. 21, 2026

(54) SYSTEM AND METHOD TO OPERATE 3D APPLICATIONS THROUGH POSITIONAL VIRTUALIZATION TECHNOLOGY

(71) Applicant: The CALANY Holding S.ÀR.L., Luxembourg (LU)

(72) Inventor: Cevat Yerli, Dubai (AE)

(73) Assignee: The CALANY Holding S.ÀR.L., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,976

(22) Filed: Jun. 11, 2024

(65) Prior Publication Data

US 2024/0338239 A1     Oct. 10, 2024

Related U.S. Application Data

(63) Continuation of application No. 16/904,441, filed on Jun. 17, 2020, now Pat. No. 12,039,354.

(Continued)

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/4557* (2013.01);
(Continued)

(58) Field of Classification Search
CPC .............. G06F 9/45558; G06F 9/5077; G06F 2009/4557; G06F 2009/45595
See application file for complete search history.

(56) References Cited

U.S. PATENT DOCUMENTS

| 7,451,196 B1 | 11/2008 | de Vries et al. |
| 7,843,471 B2 | 11/2010 | Doan et al. |
| (Continued) | | |

FOREIGN PATENT DOCUMENTS

| AU | 2014201887 A1 | 5/2014 |
| CA | 2881354 A1 | 10/2013 |
| (Continued) | | |

OTHER PUBLICATIONS

Final Office Action mailed Aug. 17, 2022, issued in U.S. Appl. No. 16/904,371, filed Jun. 17, 2020, 24 pages.

(Continued)

*Primary Examiner* — Dong U Kim
(74) *Attorney, Agent, or Firm* — BRYAN CAVE LEIGHTON PAISNER LLP

(57) ABSTRACT

A system and method to operate applications through positional virtualization technology. The system comprises a server including at least one processor and memory storing a persistent virtual world system comprising a data structure in which at least one virtual replica of at least one corresponding real object is represented, and at least one application run and hosted on at least one virtual machine virtually positioned in a location of the persistent virtual world system. Provisioning of the virtual machines is managed by a virtual machine management system stored in the memory of the server. One or more user devices connected to the servers via a network are configured to access and execute the applications hosted on the virtual machines of the at least one server and to receive resources thereof based on application requirements.

25 Claims, 9 Drawing Sheets

Related U.S. Application Data

(60) Provisional application No. 62/863,134, filed on Jun. 18, 2019.

(52) U.S. Cl.
CPC .............. *G06F 2009/45583* (2013.01); *G06F 2009/45595* (2013.01)

(56) References Cited

U.S. PATENT DOCUMENTS

| | | | |
|---|---|---|---|
| 9,072,972 B2 | 7/2015 | Ahiska et al. | |
| 9,098,167 B1 | 8/2015 | Issa et al. | |
| 9,111,326 B1 | 8/2015 | Worley, III et al. | |
| 9,160,680 B1 | 10/2015 | Skvortsov et al. | |
| 9,641,643 B2 | 5/2017 | Mohaban et al. | |
| 9,734,634 B1* | 8/2017 | Mott | G06F 3/002 |
| 10,038,741 B1 | 7/2018 | Judge | |
| 10,206,094 B1* | 2/2019 | Wen | H04W 64/006 |
| 11,032,164 B1* | 6/2021 | Rothschild | H04L 41/40 |
| 11,304,771 B2 | 4/2022 | Panescu et al. | |
| 11,307,968 B2 | 4/2022 | Yerli | |
| 11,310,467 B2 | 4/2022 | Allen et al. | |
| 11,341,727 B2* | 5/2022 | Yerli | H04N 7/157 |
| 2006/0122917 A1 | 6/2006 | Lokuge et al. | |
| 2006/0184886 A1 | 8/2006 | Chung et al. | |
| 2007/0117631 A1 | 5/2007 | Lim et al. | |
| 2007/0222750 A1 | 9/2007 | Ohta | |
| 2008/0268418 A1 | 10/2008 | Tashner et al. | |
| 2010/0287529 A1* | 11/2010 | Costa | G06F 8/34 |
| | | | 717/105 |
| 2011/0224811 A1 | 9/2011 | Lauwers et al. | |
| 2011/0295719 A1 | 12/2011 | Chen et al. | |
| 2011/0320520 A1 | 12/2011 | Jain | |
| 2012/0149349 A1 | 6/2012 | Quade | |
| 2012/0190458 A1 | 7/2012 | Gerson et al. | |
| 2012/0281706 A1 | 11/2012 | Agarwal et al. | |
| 2012/0281708 A1 | 11/2012 | Chauhan et al. | |
| 2013/0044106 A1 | 2/2013 | Shuster et al. | |
| 2013/0117377 A1* | 5/2013 | Miller | A63F 13/35 |
| | | | 709/205 |
| 2013/0219014 A1* | 8/2013 | Yerli | G06F 16/29 |
| | | | 709/217 |
| 2013/0222385 A1 | 8/2013 | Dorsey et al. | |
| 2013/0225369 A1 | 8/2013 | Fisbein et al. | |
| 2014/0002444 A1 | 1/2014 | Bennett et al. | |
| 2014/0063004 A1* | 3/2014 | Hamilton, II | G06T 19/20 |
| | | | 345/419 |
| 2014/0125557 A1 | 5/2014 | Issayeva et al. | |
| 2014/0156846 A1 | 6/2014 | Stern et al. | |
| 2014/0185616 A1 | 7/2014 | Bloch et al. | |
| 2014/0229944 A1* | 8/2014 | Wang | G06F 9/5088 |
| | | | 718/1 |
| 2014/0280644 A1 | 9/2014 | Cronin | |
| 2014/0282535 A1 | 9/2014 | Sato | |
| 2015/0120931 A1* | 4/2015 | Padala | G06F 9/5027 |
| | | | 709/226 |
| 2015/0212703 A1* | 7/2015 | Luckett, Jr. | G06F 3/04842 |
| | | | 345/158 |
| 2015/0237667 A1 | 8/2015 | Ghai et al. | |
| 2015/0296030 A1 | 10/2015 | Maes et al. | |
| 2015/0310497 A1* | 10/2015 | Valin | H04L 51/08 |
| | | | 705/14.66 |
| 2015/0341223 A1* | 11/2015 | Shen | H04L 41/122 |
| | | | 709/223 |
| 2015/0348327 A1 | 12/2015 | Zalewski | |
| 2016/0011896 A1 | 1/2016 | Khalid | |
| 2016/0133230 A1* | 5/2016 | Daniels | G06F 3/147 |
| | | | 345/633 |
| 2016/0142337 A1 | 5/2016 | Skvortsov et al. | |
| 2016/0154676 A1 | 6/2016 | Wen et al. | |
| 2016/0197835 A1 | 7/2016 | Luft | |
| 2016/0198003 A1 | 7/2016 | Luft | |
| 2016/0293133 A1 | 10/2016 | Dutt | |
| 2016/0361658 A1 | 12/2016 | Osman et al. | |
| 2017/0048308 A1 | 2/2017 | Qaisar | |
| 2017/0054792 A1 | 2/2017 | Christopher, II et al. | |
| 2017/0094018 A1 | 3/2017 | Ekstrom et al. | |
| 2017/0109187 A1 | 4/2017 | Cropper et al. | |
| 2017/0155672 A1 | 6/2017 | Muthukrishnan et al. | |
| 2017/0287496 A1 | 10/2017 | Heitkamp et al. | |
| 2017/0308696 A1 | 10/2017 | Patel et al. | |
| 2017/0366472 A1 | 12/2017 | Byers et al. | |
| 2018/0024537 A1 | 1/2018 | Chauvet et al. | |
| 2018/0060948 A1 | 3/2018 | Mattingly et al. | |
| 2018/0093186 A1 | 4/2018 | Black et al. | |
| 2018/0109282 A1 | 4/2018 | Khan et al. | |
| 2018/0159745 A1 | 6/2018 | Byers et al. | |
| 2018/0190017 A1 | 7/2018 | Mendez et al. | |
| 2018/0204301 A1 | 7/2018 | Featonby et al. | |
| 2018/0205619 A1 | 7/2018 | Rios et al. | |
| 2018/0225875 A1 | 8/2018 | Yasrebi | |
| 2018/0285767 A1 | 10/2018 | Chew | |
| 2018/0332132 A1 | 11/2018 | Sampath et al. | |
| 2018/0336727 A1* | 11/2018 | Bastian | G06Q 50/00 |
| 2018/0373412 A1 | 12/2018 | Reif | |
| 2019/0121960 A1 | 4/2019 | Brown et al. | |
| 2019/0130631 A1 | 5/2019 | Gebbie et al. | |
| 2019/0158569 A1 | 5/2019 | Singleton, IV et al. | |
| 2019/0173773 A1 | 6/2019 | Baughman et al. | |
| 2019/0197634 A1 | 6/2019 | Dange | |
| 2019/0206129 A1 | 7/2019 | Khalid | |
| 2019/0215381 A1 | 7/2019 | Mukund et al. | |
| 2019/0287208 A1 | 9/2019 | Yerli | |
| 2019/0294721 A1 | 9/2019 | Keifer et al. | |
| 2019/0321725 A1* | 10/2019 | Zimring | A63F 13/355 |
| 2019/0339840 A1 | 11/2019 | Park et al. | |
| 2019/0362312 A1* | 11/2019 | Platt | G06Q 10/10 |
| 2020/0007462 A1 | 1/2020 | Singhal et al. | |
| 2020/0007615 A1 | 1/2020 | Brebner | |
| 2020/0143583 A1 | 5/2020 | Jiang et al. | |
| 2020/0151958 A1 | 5/2020 | Livneh | |
| 2020/0159421 A1 | 5/2020 | Karumbunathan et al. | |
| 2020/0186445 A1* | 6/2020 | Govindaraju | H04L 67/34 |
| 2020/0245160 A1 | 7/2020 | Chu et al. | |
| 2020/0401436 A1 | 12/2020 | Yerli | |

FOREIGN PATENT DOCUMENTS

| | | | |
|---|---|---|---|
| CA | 2899263 | A1 | 8/2014 |
| CA | 3000643 | A1 | 4/2017 |
| CA | 3100815 | A1 | 9/2019 |
| CA | 3097146 | A1 | 10/2019 |
| CA | 3046247 | A1 | 12/2019 |
| CN | 102739771 | A | 10/2012 |
| CN | 107148620 | A | 9/2017 |
| CN | 107454128 | A | 12/2017 |
| CN | 108369533 | A | 8/2018 |
| CN | 109634720 | A | 4/2019 |
| EP | 3 333 706 | A1 | 6/2018 |
| WO | 2009/029559 | A1 | 3/2009 |
| WO | 2015/123849 | A1 | 8/2015 |
| WO | 2016/164178 | A1 | 10/2016 |
| WO | 2017/064560 | A1 | 4/2017 |
| WO | 2017/064560 | A8 | 4/2017 |
| WO | 2017212036 | A1 | 12/2017 |
| WO | 2019/079826 | A1 | 4/2019 |

OTHER PUBLICATIONS

Final Office Action mailed Jan. 17, 2023, issued in U.S. Appl. No. 16/904,130, filed Jun. 17, 2020, 30 pages.

Final Office Action mailed Mar. 8, 2023, issued in U.S. Appl. No. 16/904,371, filed Jun. 17, 2020, 29 pages.

Office Action mailed May 3, 2021 issued in U.S. Appl. No. 16/904,130, filed Jun. 17, 2020, 35 pages.

Microsoft Developer: "Developing Mobile Augmented Reality (AR) Applications with Azure Spatial Anchors—BRK2034", May 14, 2019 (May 14, 2019), pp. 1-8, XP54981052, Retrieved from the Internet: URL:https://www.youtube.com/watch?v=CVmfP8 TaqNU [retrieved on Oct. 30, 2020].

Extended European Search Report mailed Nov. 24, 2020, issued in European Application No. 20180853.2, 12 pages.

(56)            References Cited

OTHER PUBLICATIONS

Extended European Search Report mailed Dec. 1, 2020, issued in European Application No. 20180906.8, 10 pages.

Hong, C., et al., "Resource Management in Fog/Edge Computing: A Survey," ACM Computing Surveys, 97: 1-22, Sep. 2019.

Atzori, L., et al., "SDN&NFV Contribution to IoT Objects Virtualization," Computer Networks, 149: 200-212, Feb. 2019.

Nastic, S., et al., "A Middleware Infrastructure for Utility-based Provisioning of IoT Cloud Systems," 2016 IEEE/ACM Symposium on Edge Computing (SEC), Washington D.C., Oct. 27-28, 2016, IEEE Computer Society, pp. 28-40.

Bruschi, R., et al., "Personal Services Placement and Low-Latency Migration in Edge Computing Environments," 2018 IEEE Conference on Network Function Virtualization and Software Defined Networks (NFV-SDN): 5GNetApp—5G-ready Network Applications, Services Development and Orchestration over Application-aware Network Slices @IEEE NFV-SDN 2018, Verona, Italy, Nov. 27-29, 2018, IEEE, 6 pages.

Extended European Search Report mailed Nov. 18, 2020, issued in European Application No. 20180891.2, 14 pages.

Cohen, B., et al., "Cloud Edge Computing: Beyond the Data Center," Berlin Summit at OpenStack, Oct. 2, 2018, <https://www.openstack.org/edge-computing/cloud-edge-computing-beyond-the-data-center/> [retrieved Jun. 11, 2019], 22 pages.

Kaul, A., et al., "Using Virtualization for Distributed Computing," International Journal of Advances in Electronics and Computer Science 2(7):37-39, Jul. 2015.

Mital, Z., "Distributed Message Exchange System Modelling," in A. Sydow et al. (eds.), "Systems Analysis and Simulation," 1988, pp. 196-197, Akademie-Verlag Berlin.

* cited by examiner

900

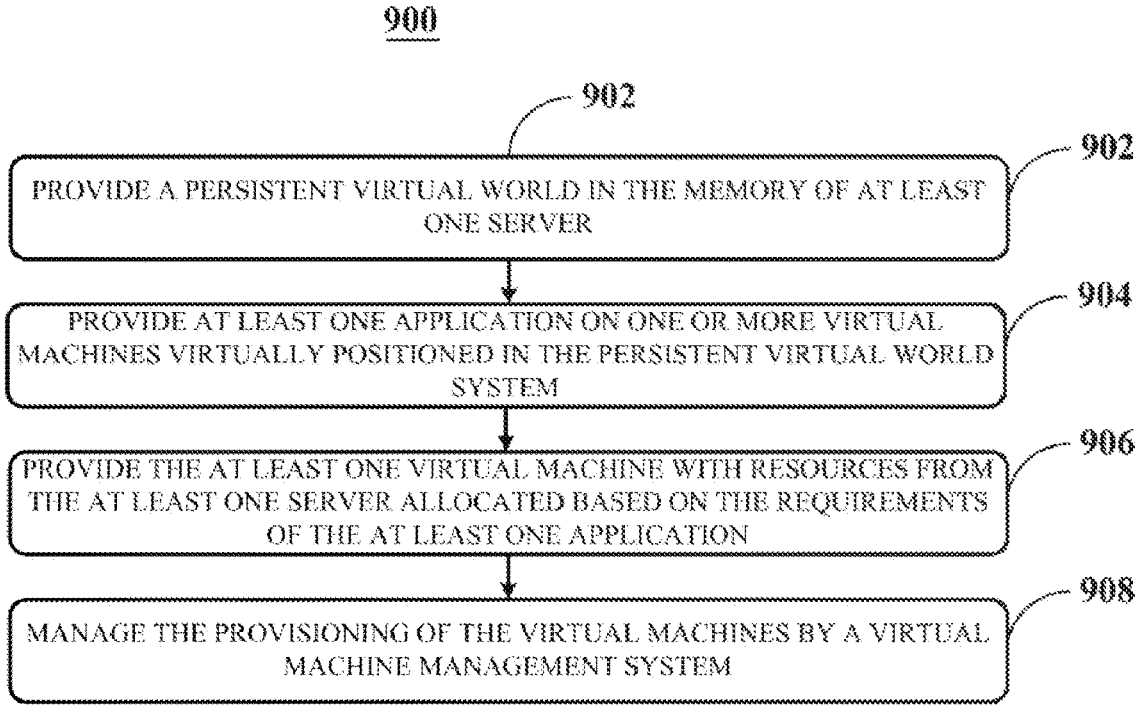

902

PROVIDE A PERSISTENT VIRTUAL WORLD IN THE MEMORY OF AT LEAST ONE SERVER

902

PROVIDE AT LEAST ONE APPLICATION ON ONE OR MORE VIRTUAL MACHINES VIRTUALLY POSITIONED IN THE PERSISTENT VIRTUAL WORLD SYSTEM

904

PROVIDE THE AT LEAST ONE VIRTUAL MACHINE WITH RESOURCES FROM THE AT LEAST ONE SERVER ALLOCATED BASED ON THE REQUIREMENTS OF THE AT LEAST ONE APPLICATION

906

MANAGE THE PROVISIONING OF THE VIRTUAL MACHINES BY A VIRTUAL MACHINE MANAGEMENT SYSTEM

SYSTEM AND METHOD TO OPERATE 3D APPLICATIONS THROUGH POSITIONAL VIRTUALIZATION TECHNOLOGY

CROSS-REFERENCE TO RELATED APPLICATION

The present application is Continuation application of U.S. patent application Ser. No. 16/904,441, filed Jun. 17, 2020, which claims priority to and the benefit of Provisional Application No. 62/863,134, filed Jun. 18, 2019, the entire contents of which are incorporated herein by reference.

TECHNICAL FIELD

The present disclosure generally relates to computer systems. More specifically, the present disclosure relates to a system and method to operate location-based applications.

BACKGROUND ART

One of the challenges when developing, deploying, and running location-based applications in the cloud is performing an efficient resource allocation. In part, this is accomplished through virtualization technology, such as by hosting the application in a virtual machine (VM). A VM includes software that encapsulates the application and provides all of the operating system and hardware requirements that would normally be provided by a physical machine. VMs enable a dynamic allocation of computing resources that are a fraction of the computing resources available on the physical machine, enabling multiple applications to run on the same physical machine. VMs can use one or multiple combined physical computers to form a computing resource pool for optimized resource allocation. For each application, based on the demand, the appropriate amount of resources is extracted from the resource pool. Thus, one VM can be formed to suit each application, as well as one appropriate operating system, enabling interoperability of applications with different operating systems and a flexible, but not necessarily optimized, use of resources.

In data centers, where the VMs are normally hosted, they are typically monitored and managed by virtual machine monitors (VMMs) called hypervisors. Hypervisors usually monitor and manage locating details (usually the IP address of the host where the VM is running), system utilization parameters, and computing task circumstances. According to these parameters, the VMMs can then optimize the workload by provisioning the adequate resources to the VMs, activating or deactivating the VMs depending on usage, and, if necessary migrating them to other hosts.

As digital reality technologies advance, more location-based 3D applications, many in the form of augmented and virtual reality, as well as implementations for smart cities and Internet-of-Things (IoT), the use of virtualization technologies has increased, along with their demand of resources. Thus, current VM provisioning methods do not satisfy the new resource requirements, creating a need for improved resource allocation solutions through virtualization technologies.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Drawbacks described in the background or other technical problems are addressed through systems and methods of the current disclosure. In some embodiments, virtual machines (VMs), apart from protecting applications by containing the code in a virtual environment, enable interoperability with various operating systems and enhance resource utilization by allowing the physical computers to provision resources (e.g., compute, network, storage, etc.) from a common resource pool, typically from cloud servers. The VMs are physically hosted on servers or other computing devices included in a cloud-to-edge infrastructure comprising, enabling the migration of the VMs to different physical locations depending on the resource capacity of the current physical hosts. In some embodiments, VMs are hosted on bare-metal servers, which are physical servers dedicated to a single tenant (e.g., a person or entity renting the physical server) but which can be used by a plurality of users as entitled by the tenant.

Hypervisors, also known as virtual machine monitors (VMMs), are computer software, firmware or hardware that create and run VMs. The hypervisors usually monitor and manage locating details (e.g., the IP address of the host where the VM is running), system utilization parameters, and computing task circumstances. The hypervisors of the current disclosure are further configured to obtain a virtual location of the VMs linked to a real location, which can provide VM management system with further data that can be used in the resource optimization of each VM and of the whole system.

The cloud-to-edge infrastructure that may be employed in the current disclosure may display distributed computing capabilities employing public or private clouds, fog servers, and edge devices and systems, such as enterprise systems, mobile platforms, and user devices, all of which may connect through a network. This way, resources including physical servers and network equipment enable a shared storage and computing that may be dynamically allocated depending on factors such as the distance of the user to the resources and the network and computational demand from the users.

In an embodiment, a system to operate applications (e.g., 3D applications) through positional virtualization technology of the current disclosure comprises one or more servers comprising at least one processor and memory, the one or more servers storing a persistent virtual world system comprising a data structure in which at least one virtual replica of at least one corresponding real object is represented, and at least one application run and hosted on at least one virtual machine virtually positioned in a location of the persistent virtual world system. The one or more servers comprise hardware infrastructure providing the at least one virtual machine with resources allocated based on the requirements of the at least one application. Provisioning of the virtual machines is managed by a virtual machine management system stored in the memory of the server based on a distance prioritization parameter (e.g., taking into account the distance of user devices to the at least one virtual machine). In an embodiment, the system further comprises one or more user devices connected to the servers via a network, the user devices being configured to access and execute the applications hosted on the virtual machines of the at least one server and to receive resources thereof based on application requirements.

According to an embodiment, the VM management system comprises a global VM manager performing VM resource requirement assessment and provisioning through a hypervisor interfacing at least one of the VMs. The hypervisor may further comprise a local VM manager connected to the global VM manager and configured to provide the global VM manager with a resource assessment of each of the VMs. The local VM manager comprises a monitoring component measuring VM resource utilization. In an embodiment, the local VM manager further comprises a feedback controller configured to determine required resource allocations for each VM, and an arbitrator obtaining resource allocation requests from the feedback controller and sets the resource shares for each VM.

In some embodiments, the global VM manager is part of a 3D engine that enables the development, testing, and publishing of VM-hosted 3D applications in the virtual world linked to a location in the real world. Thus, application developers may find a suitable solution to develop 3D applications in a virtual environment that may protect the application code from potential crashes or malware, enable interoperability of the application with the different operating systems, an enhanced resource provisioning, and an accurate positioning of the applications in the virtual world to enable location-based content.

According to an embodiment, the VM management system further manages the resource provisioning to the VMs based on a data relevance filter that takes into account contextual data, 3D data structure of virtual elements, or other techniques, such as scene graphs, level of detail (LOD) management, preparation for rendering stages, load balancing, and VM migration, amongst others.

In an embodiment, a 3D data structure used to represent the persistent virtual world system and virtual objects therein comprises, without limitations, one or more octrees, quadtrees, BSP trees, sparse voxel octrees, 3D arrays, kD trees, point clouds, wire-frames, boundary representations (B-Rep), constructive solid geometry trees (CSG Trees), bintrees, or hexagonal structures, or a combination thereof. The 3D data structure serves the function of accurately and efficiently representing the data of each of the geometries of the virtual objects in the persistent virtual world system. A correct selection of the 3D data structure depends, by way of example, on the origin of the data, the precision of geometries sought for during rendering; whether the rendering is done in real-time or pre-rendered; whether the rendering is performed via the cloud servers, via the user devices, or combinations thereof; the specific applications for which the persistent virtual world system is employed, for example, a higher level of definition may be required for medical or scientific applications than for other types of applications; memory capacities from the servers and from the user devices and thus, desired memory consumption; and others.

Optimizations through the 3D data structure in the current disclosure facilitate leveraging 3D realtime graphic techniques and spatial principles employed in high-end game and simulation engines. These techniques and principles help to optimize the exchanges of data and the distributed computing of applications and services through the network of computing resources connected to the server.

Scene graphs are a data structure drawn schematically to arrange the logical and spatial representation of a graphical scene. Scene graphs are typically drawn with root nodes on top, and leave nodes at the bottom. In some embodiments, the root node may comprise the virtual world of the persistent virtual world system, which is then broken down into a hierarchy of nodes representing either spatial groupings of objects, settings of the position of objects, animations of objects, or definitions of logical relationships between objects (e.g., for managing the various states of a traffic light). Leaves of the scene graph represent the physical objects themselves, the drawable geometry and their material properties. In terms of performance, scene graphs provide a suitable framework for maximizing graphics performance.

LOD management involves decreasing the complexity of a 3D model representation as the model moves away from the viewer, or according to other metrics such as object importance, viewpoint-relative speed, or position. LOD is a feature typically used in game engines to optimize real-time rendering, using more detailed models only where the point of view of the user is closer to the object. LOD management increases the efficiency of rendering by decreasing the workload on graphics pipeline usage, typically vertex transformations. In general, LOD management may improve framerates and reduce memory usage. In this way, for example, different physical models can be associated to the virtual replicas, from low to high fidelity models, so that different simulations can be done depending on the case and situation. For example, a macro-simulation of the traffic in a city can be computed using low-fidelity models, but a micro-simulation using a high-fidelity model may be used to assist the autonomous driving of a vehicle.

Preparation for rendering stages may include any of several techniques utilized prior to performing computing rendering on a graphics scene, which may optimize the resource utilization and time employed during the actual rendering of the scene. For example, preparation for rendering stages may comprise techniques such as depth-culling, frustum culling, high-level occlusion culling, and preprocessing.

Load balancing is the even distribution of processing and bandwidth across available resources such as servers and antennas in the network or disks in a storage area network (SAN). Load balancing may use information from the macro-environment specific to the distance between user devices and network equipment, along with individual requirements per user, in order to balance network resources. Load balancing contributes to optimizing network bandwidth by dynamically allocating resources to assure optimized use of the network, minimizing network traffic.

Other techniques may also be used in order to optimize data computing, rendering, and provisioning to users, such as perspective switching, which comprises changing from a higher resource-consuming visual perspective of a graphics scene to a lower one in order to save resources. Other techniques may further include multithreading, whereby the processor may execute multiple processes or threads concurrently while sharing resources of a single or multiple cores of the processor. The data global virtual machine manager may also utilize VM migration techniques, whereby VMs are moved from one host to another when the resource capacity of the host reaches a predetermined level.

In an alternative embodiment, the VMs may be replaced by containers, which also enable running applications in a virtual environment and to protect the application code. In this embodiment, the container virtualization technology is also positioned in a virtual location linked to real-world coordinates to achieve enhanced resource assessment and provisioning, but instead of using a hypervisor to monitor and manage the VMs and to emulate the host OS, the container shares the operation system kernel without the need of individual guest operating systems, making the containers much more lightweight and using fewer resources than VMs.

According to an embodiment, a method to operate applications through virtualization technologies comprises the steps of providing, in memory of a server system comprising one or more servers, a persistent virtual world system comprising a data structure in which at least one virtual replica of at least one corresponding real object is represented; providing in the memory of the server system a VM management system and at least one application run and hosted on one or more VMs virtually positioned in a location of the persistent virtual world system, the application(s) being interacted with by one or more user devices connected to the server system via a network; providing the VM(s) with resources from the server system allocated based on the requirements of the application(s); and managing the provisioning of the VM(s) by the VM management system, wherein the management is based on a distance prioritization parameter taking into account the distance of user devices to the VM(s).

According to an embodiment, managing the provisioning of the VM(s) by a VM management system comprises the steps of performing a resource requirement assessment by a global VM manager; and allocating the resources to the VM(s) by the global VM manager.

According to an embodiment, managing the provisioning of the VM(s) is further based on a data relevance filter that takes into account contextual data, 3D data structure of virtual elements, and other techniques, such as scene graphs, level of detail (LOD) management, preparation for rendering stages, load balancing, and VM migration, amongst others.

Computer-readable media having stored thereon instructions configured to cause the one or more computers to perform any of the methods described herein are also described.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages of the present disclosure will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where:

FIG. 9 depicts a block diagram of a method to operate 3D applications through virtualization technology, according to an embodiment.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
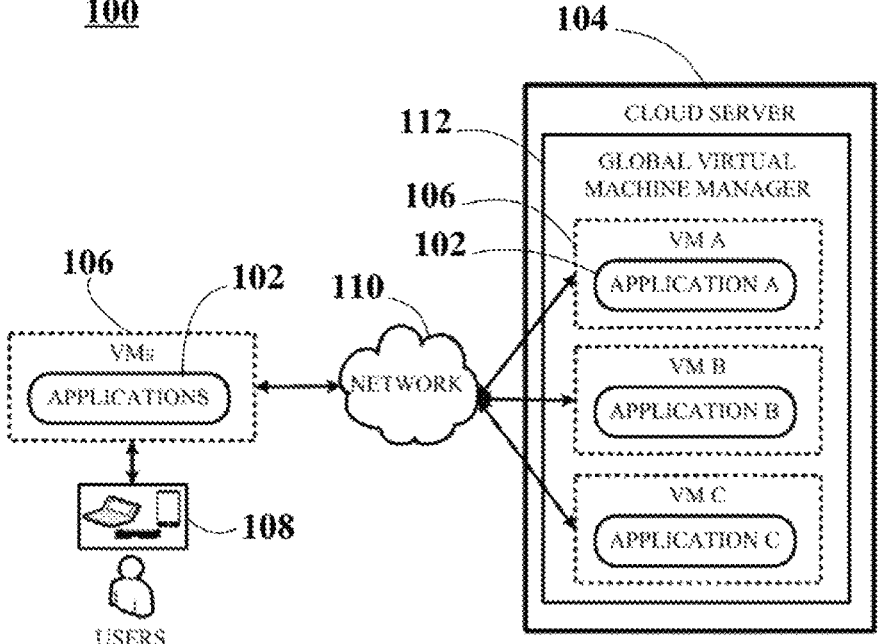
FIG. 1 depicts a schematic representation of a system to operate 3D applications through virtualization technology, according to an embodiment.

FIG. 1 depicts a schematic representation of a system 100 to operate applications 102 (e.g., 3D applications in a virtual world system) through virtualization technology, according to an embodiment.

The system 100 to operate 3D applications 102 through positional virtualization technology of the current disclosure comprises one or more servers 104 storing and implementing at least one 3D application 102 run and hosted on a virtual machine (VM) 106, the one or more servers 104 comprising a hardware infrastructure that provides the at least one VM 106 with resources depending on the demand of the at least one 3D application 102. The provisioning of the VMs 106 is managed by a VM management system based on at least a distance prioritization parameter, wherein the VMs 106 are virtually positioned in a location of a persistent virtual world system comprising virtual replicas of the real world and corresponding to a location in the real world. One or more user devices 108 connect to the servers 104 via a network 110, the user devices 108 being configured to access and execute the 3D application 102 hosted on the VMs of the one or more servers 104 and to receive resources thereof based on application resource demand.

In some embodiments, each of the virtual replicas and the VMs may be geolocated using a reference coordinate system suitable for use with current geolocation technologies. For example, the virtual replicas may use a World Geodetic System standard such as WGS84, which is the current reference coordinate system used by GPS.

In various embodiments, the virtual replicas may comprise data stores and models, where the data stores comprise properties of the virtual replicas, and the models are the graphical, mathematical and logical representations of any aspect of the real-world element represented by the virtual replica. The virtual replicas may include any type of model, including at least 3D, geometric, and dynamic models. 3D and geometry models allow the visualization of the virtual replicas and to simulate collisions and interactions with other entities in the merged reality world. Dynamic models allow to simulate the behavior of the real world objects and may include continuous (e.g., algebraic or differential equations) and discrete (e.g., as state-machine or stochastic models) dynamics models. In other embodiments, virtual replicas can have also a machine learning model associated, so AI techniques may be used to optimize the operation and/or performance of the real world element through the corresponding virtual replica, which can facilitate computing optimizations by the computing optimization platform In some embodiments, a virtual replica includes one or more of 3D world and building data, such as SLAM or derivate-mapping based data; 3D geometry data; 3D point cloud data; or geographic information system data representing real-world structural properties that may serve to model a 3D structure for digital reality applications.

According to an embodiment, the VM management system comprises a global VM manager 112 performing VM resource requirement assessment and provisioning to the VMs 106.

In some embodiments, the global VM manager 112 is part of a 3D engine that enables the development, testing, and publishing of VM-hosted 3D applications 102 in the virtual world linked to a location in the real world. Thus, application developers may find a suitable solution to develop 3D applications 102 in a virtual environment that may protect the application code from potential crashes or malware, enable interoperability of the application with the different operating systems, an enhanced resource provisioning, and an accurate positioning of the 3D applications 102 in the virtual world to facilitate location-based content.

The network 110 may comprise antennas configured to transmit and receive radio waves that enable mobile across edge and cloud. Antennas may be connected through wired or wireless means to computing centers. In other embodiments, the antennas are provided within the computing centers and/or areas near the computing centers. In some embodiments, in order to service user devices and/or real objects located outdoors, the antennas may include milli-meter wave (mmW)-based antenna systems or a combination of mmW-based antennas and sub-6 GHZ antenna systems, herein grouped as and referred to as 5G antennas. In other embodiments, the antennas may include other types of antennas, such as 4G antennas, or may be used as support antennas for the 5G antenna systems. In embodiments where antennas used for servicing real-time 3D-based interaction devices located indoors, the antennas may use Wi-Fi, preferably, but not limited to, providing data at 60 GHz.

In other embodiments, global navigation satellite systems (GNSS), which refers generally to any satellite-based navigation systems like GPS, BDS, Glonass, QZSS, Galileo, and IRNSS, may be used for enabling positioning of devices. Employing signals from a sufficient number of satellites and techniques such as triangulation and trilateration, GNSS can calculate the position, velocity, altitude, and time of devices. In an embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, preferably, but not limited to, providing data at 60 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of devices is implemented by a combination of AGNSS and inertial sensors in the devices.

According to an embodiment, the system 100 of current disclosure may be implemented in a cloud to edge infrastructure that may display distributed computing capabilities employing public or private clouds, fog servers, and edge devices and systems, such as enterprise systems, mobile platforms, and user devices, all of which may connect through a network. Using a cloud to edge computing network, access to computing power, computer infrastructure (e.g., through so-called infrastructure as a service, or IaaS), applications, and business processes can be delivered as a service to users via client devices on demand. This way, resources including physical servers and network equipment enable a shared storage and computing that may be dynamically allocated depending on factors such as the distance of the user to the resources and the network and computational demand from the users.

In the current disclosure, the term "persistent" is used to characterize a state of a system that can continue to exist without a continuously executing process or network connection. For example, the term "persistent" may be used to characterize the virtual world system where the virtual world system and all of the virtual replicas, purely virtual objects and applications therein comprised continue to exist after the processes used for creating the virtual replicas, purely virtual objects and applications cease, and independent of users being connected to the virtual world system. Thus, the virtual world system is saved in a non-volatile storage location (e.g., in a server). In this way, virtual replicas, purely virtual objects and applications may interact and collaborate with each other when being configured for accomplishing specific goals even if users are not connected to the server.

In an alternative embodiment, the VMs 106 may be replaced by containers, which also enable running applications in a virtual environment and to protect the application code. In this embodiment, the container virtualization technology is also positioned in a virtual location linked to real-world coordinates to achieve enhanced resource assessment and provisioning, but instead of using a hypervisor to monitor and manage the VMs and to emulate the host OS, the container shares the operation system kernel without the need of individual guest operating systems, making the containers much more lightweight and using fewer resources than the VMs 106.

Figure 2:
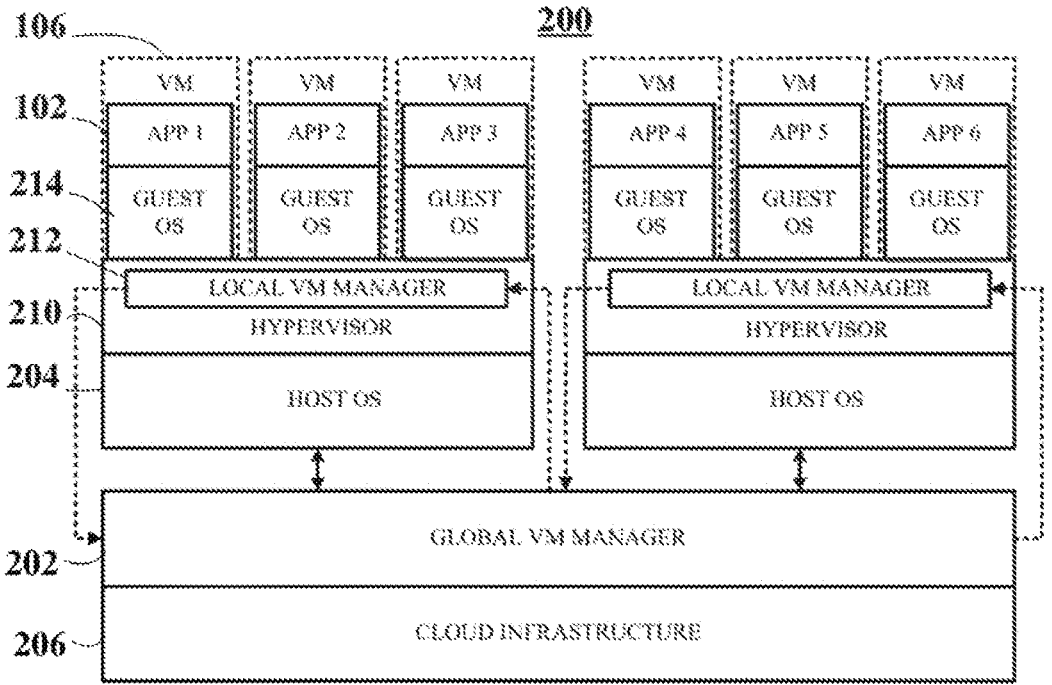
FIG. 2 depicts a schematic representation of a system for managing 3D applications through a global virtual machine manager communicating with at least one host operating system comprising a plurality of virtual machines, according to an embodiment.

FIG. 2 depicts a schematic representation of a system 200 for managing 3D applications 102 through a global VM manager 202 communicating with at least one host operating system 204 comprising a plurality of virtual machines 106, according to an embodiment.

As viewed in FIG. 2, the global VM manager 202 obtains resources from a cloud infrastructure 206 and sends the resources to the VMs 106 through one or more host operating systems 204 based on the demand of each individual 3D application 102. Each VM 106 is simulated in a hypervisor 210, each hypervisor 210 comprising a local VM manager 212 having dedicated software and/or hardware (e.g., sensors) configured to monitor and manage locating details of each VM 106, system utilization parameters, and computing task circumstances of each VM 106, and to send the demand assessment of each VM 106 to the global VM manager 202.

In an embodiment, the locating details monitored by the local VM manager 212 of the hypervisor 210 comprise the IP address of the host where the VM 106 is physically running along with a virtual location in the persistent virtual world system linked to real-world coordinates. The global VM manager 202 stores and manages the locating details of each VM 106 in addition to the other demand parameters, and utilizes the demand assessment from the local VM manager 212 in order to make an overall resource provisioning assessment for provisioning each hypervisor 210 with required resources. The hypervisors 210 are able to simulate a plurality of guest operating systems 214, as may be required by the 3D applications 102 for enabling interoperability.

Figure 3:
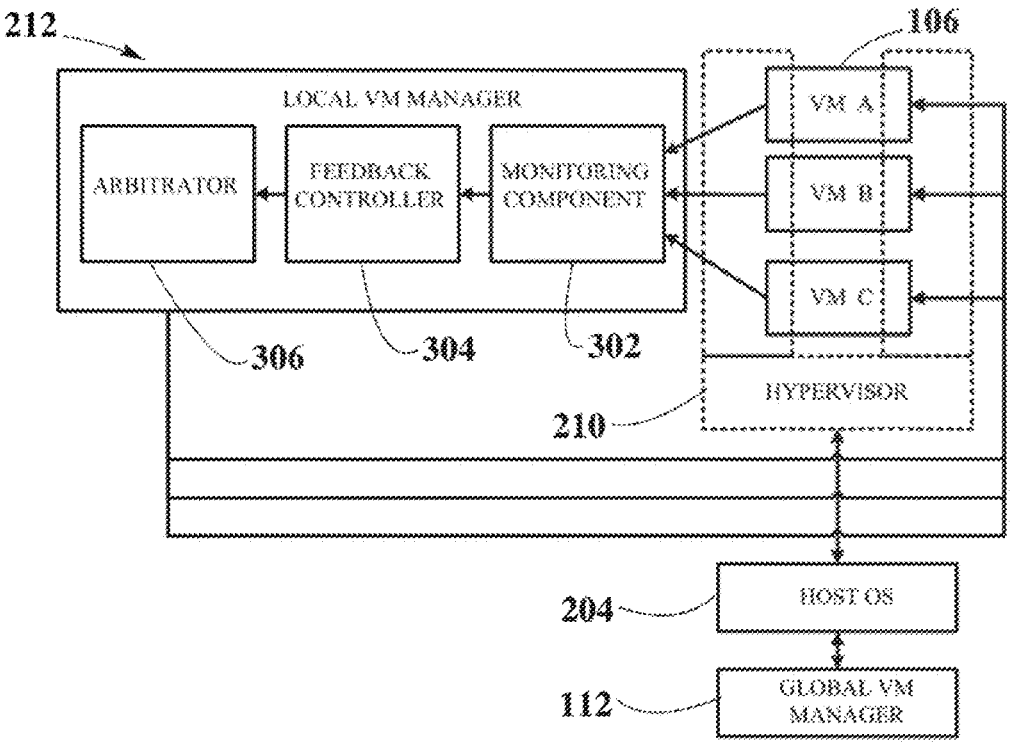
FIG. 3 depicts a schematic representation of a local virtual machine manager for managing local virtual machine resource utilization and demand, according to an embodiment.

FIG. 3 depicts a schematic representation of a local VM manager 212 for managing local virtual machine resource utilization and demand, according to an embodiment. Some elements of FIG. 3 may be similar to elements of FIGS. 1-2, and thus similar or identical reference numerals may be used to depict those elements.

The local VM manager 212 comprises a monitoring component 302 measuring VM resource utilization, a feedback controller 304 configured to determine required resource allocations for each VM 106, and an arbitrator 306 obtaining resource allocation requests from the feedback controller 304 and setting the resource shares for each VM 106.

In an embodiment, the monitoring component 302 measures the average resource utilization of VMs 106 in control intervals, which may be set by an administrator depending on how quickly the local node should react to the load and also being affected by the time taken by the arbitrator 306. The feedback controller 304 uses control theory to determine the required resource allocations to be given to each VM 106 in order to keep the resource utilization at a desired level to maintain quality of service or other objectives. The arbitrator 306 takes resource allocation requests for all VMs 106 of that particular host operating system 204 from the feedback controller 304, and according to the utility of each VM 106, sets the resource shares to maximize the local node utility function. The desired resource shares are sent to the global VM manager 202, which assesses the resource requirements of all VMs 106 of all host operating systems 204 and proceeds to allocate the resources through the local VM manager 212.

Figure 4:
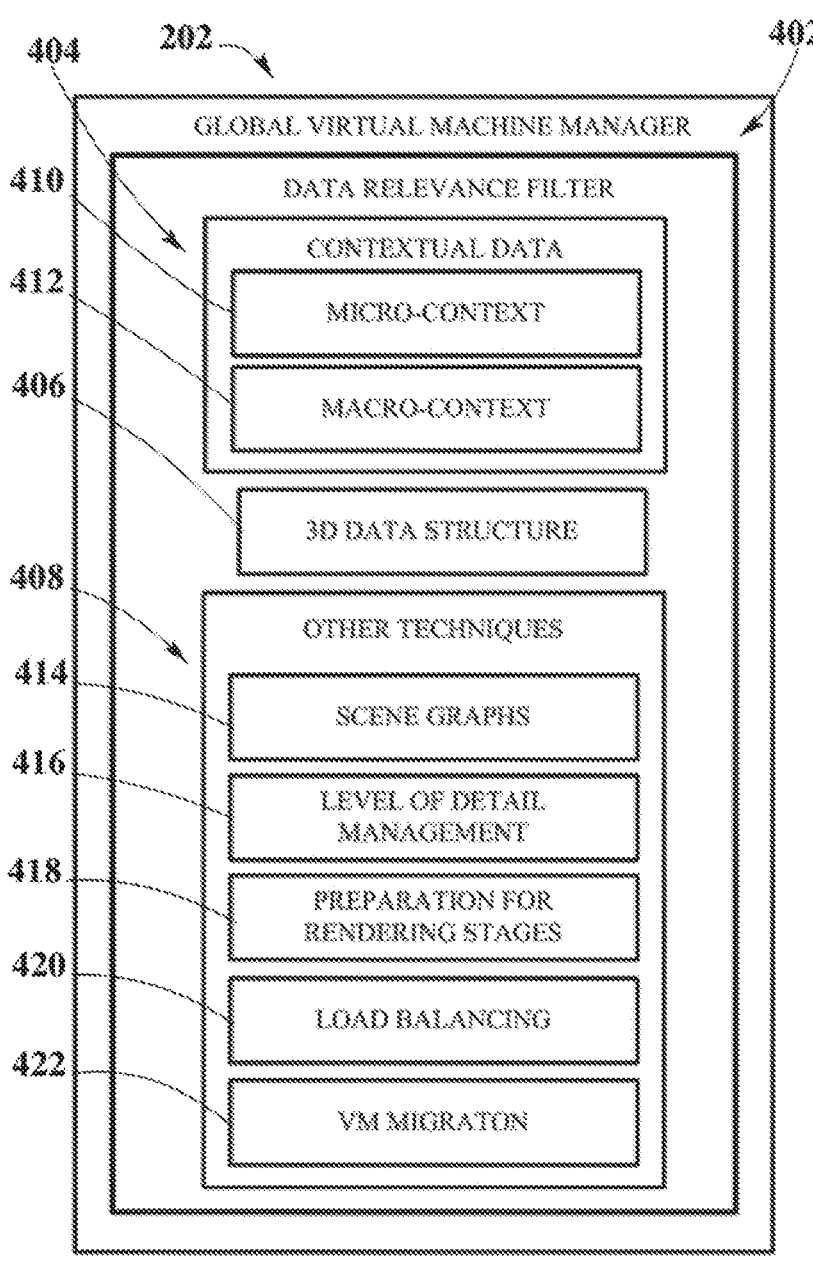
FIG. 4 depicts a schematic representation of a data relevance filter and parameters thereof, according to an embodiment.

FIG. 4 depicts a schematic representation of a data relevance filter 402 of the global VM manager 202 and example parameters thereof, according to an embodiment. Some elements of FIG. 4 may be similar to elements of FIGS. 1-3, and thus similar or identical reference numerals may be used to depict those elements.

The data relevance filter 402 is configured to store and provide data and computer instructions with rules that, when implemented by a processor of the server, filter and analyze the data that is required to assess and provision the plurality of virtual machines with adequate resources. The data relevance filter 402 obtains required data from the local VM managers 212 of the hypervisor 210, as described with reference to FIG. 3. According to an embodiment, the data relevance filter 402 comprises computer programs incorporating contextual data 404, 3D data structure 406, and other techniques 408.

The term "context" or "contextual data", as used in the current disclosure, may be classified as micro-context 410 or macro-context 412. In an embodiment, context refers to data related to the direct or indirect environment of a user device employed that has accessed the persistent virtual world system. In some embodiments, calculation of aspects dealing with contextual data may be performed through machine learning techniques.

Particular data structures may be used to more effectively implement one or more aspects described herein, and such data structures are contemplated within the scope of computer executable instructions and computer-usable data of the current disclosure. In particular, the representation of spatial data is an important issue in the programming of the persistent virtual world system, involving the computing, renderization and display of computer graphics, visualization, solid modeling, and related areas, for which 3D data structures 406 may be especially useful. Depending on the field of application of the persistent virtual world system where the virtual replicas are stored and the characteristics and sources of the input data, different types of representations may be employed. The 3D data structure 406 is used to represent the persistent virtual world system and applications, ads, and other virtual objects therein stored. The 3D data structure 406 serves the function of accurately and efficiently representing the data of each of the geometries of the virtual objects in the persistent virtual world system. The 3D data structure 406 allows, for example, a smoother interaction effect between virtual and real objects within the persistent virtual world system, facilitating a more accurate occlusion or collision effect between the objects. Examples of 3D data structures 406 comprise, without limitations, octrees, quadtrees, BSP trees, sparse voxel octrees, 3D arrays, kD trees, point clouds, wire-frames, boundary representations (B-Rep), constructive solid geometry trees (CSG Trees), bintrees, and hexagonal structures, amongst others.

A correct selection of the 3D data structure 406 is affected by the origin of the data, the precision of geometries sought for during rendering; whether the rendering is done in real-time or pre-rendered; whether the rendering is performed via servers, via the user devices, or combinations thereof; the specific applications for which the persistent virtual world system is employed; and memory capacities from the servers and from the user devices and thus, amongst others.

For example, octrees represent a volume directly in the data structure. Their main advantages are a fast and easy combination of several objects; implementing a simple rendering; enabling performing quick spatial searches; and enabling a model generation through digitalization of real objects (e.g., LIDAR or other image scanning). On the other hand, disadvantages of octrees are that they present high storage demands for an accurate approximation of complex and curved objects; present hard-to-implement transformations; and do not allow general objects to be represented exactly. In another example, BSP trees display trivial transformations; fast rendering with correct occlusion; can be used to represent general objects; and enable model generation based on digitized objects. BSP trees, however, present disadvantages such as needing curved surfaces to be approximated; restricting only the usage of convex polygons; and presenting a high memory consumption, especially for curved and complex objects. In another example, B-reps represent all objects by their boundaries, and present advantages such as enabling easy transformations; enabling general representation of many objects; and allowing model generation to be based on digitized objects. B-reps, on the other hand, present a high memory consumption (especially for the accurate approximation of curved surfaces); combinations are costly; and curved faces have to be approximated. As will be appreciated by one of skill in the art, the disclosed 3D data structures 406 and other 3D data structures not disclosed may display more non-exhaustive advantages and disadvantages, and the selection of a correct 3D structure will depend on the necessary application of the persistent virtual world system and system requirements, amongst others.

Optimizations through the 3D data structure 406 in the current disclosure facilitate leveraging 3D realtime graphic techniques and spatial principles employed in high-end game and simulation engines. These techniques and principles help to optimize the exchanges of data and the distributed computing of applications and services through the network of computing resources connected to the server. The spatial principles are the spatial and temporal connections and constraints among phenomena happening on the extended reality. Physical phenomena (i.e., events taking place in the real world involving real world elements) are continuous data, while digital representations (i.e., the persistent virtual world system and the virtual replicas) are discrete for both space and time. Thus, closer things are more related to things that are farther away because correlations exist among parameters, time and space. Additionally, the multiscalar representations, from macro to micro-scales, are enabled.

The other techniques 408 may comprise methods that may assist in the filtering and optimization of the computing, rendering, and provisioning of data to users, and may include the use of scene graphs 414, level of detail management (LOD) 416, preparation for rendering stages 418, load balancing 420, and VM migration 422, amongst others.

Scene graphs 414 are a data structure drawn schematically with root nodes on top, and leave nodes at the bottom. The root node encompasses a virtual world and is then broken down into a hierarchy of nodes representing either spatial groupings of objects, settings of the position of objects, animations of objects, or definitions of logical relationships between objects such as those to manage the various states of a traffic light. Leaves of the scene graph 414 represent the physical objects themselves, the drawable geometry and their material properties. In terms of performance, scene graphs 414 provide an excellent framework for maximizing graphics performance. A good scene graph employs two key techniques: culling of the objects that are not displayed on a viewing frustum, and state sorting of properties such as textures and materials, so that all similar objects are drawn together. Scene graphs 414 are also easily migrated from one platform to another, and also enable managing complex hardware configurations, such as clusters of graphics machines, or multiprocessors/multiple systems.

LOD management 416 involves decreasing the complexity of a 3D model representation as the model moves away from the viewer, or according to other metrics such as object importance, viewpoint-relative speed, or position. LOD is a feature typically used in game engines to optimize real-time rendering, using more detailed models only where the point of view of the user is closer to the object. LOD management 416 increases the efficiency of rendering by decreasing the workload on graphics pipeline usage, typically vertex transformations. The reduced visual quality of the model is often unnoticed because of the small effect on object appearance when distant or moving fast. In general, LOD management may improve framerates and reduce memory usage. In this way, for example, different physical models can be associated to the virtual replicas, from low to high fidelity models, so that different simulations can be done depending on the case and situation. For example, a macro-simulation of the traffic in a city can be computed using low-fidelity models, but a micro-simulation using a high-fidelity model may be used to assist the autonomous driving of a vehicle.

In an embodiment, preparation for rendering stages 418 may involve any of several techniques or combinations of techniques utilized prior to performing computing rendering on a graphics scene, which may optimize the resource utilization and time employed during the actual rendering of the scene. For example, preparation for rendering stages may comprise techniques such as depth-culling, frustum culling, high-level occlusion culling, and/or other preprocessing.

Load balancing 420 is the even distribution of processing and bandwidth across available resources such as servers and antennas in the network or disks in a storage area network (SAN). Load balancing 420 may use information from the macro-environment specific to the distance between user devices and network equipment, along with individual requirements per user, in order to balance network resources. Load balancing 420 contributes to optimizing network bandwidth by dynamically allocating resources to assure optimized use of the network, minimizing network traffic.

In an embodiment, VM migration 422 refers to the process of moving a running VM between different physical machines without disconnecting the user device or application. The global VM manager 202 transfers the resources of the respective VM from the original guest machine to the destination. VM migration 422 may occur in cases where the computer hosting the VM is overloaded and needs to transfer some of the load to another physical machine.

Other techniques 408 may also be used in order to optimize data computing, rendering, and provisioning to users, such as perspective switching. For example, the data relevance filter 402 may consider switching from a 3D perspective into a 2.5D or 2D perspective in order to reduce memory usage and increase overall computing and rendering efficiency. The term 2.5D comprises using 3D graphics restricted to two dimensions or otherwise fixed-perspective view. Other techniques 408 may also include multithreading, whereby the processor may execute multiple processes or threads concurrently while sharing resources of a single or multiple cores of the processor.

Figure 5:
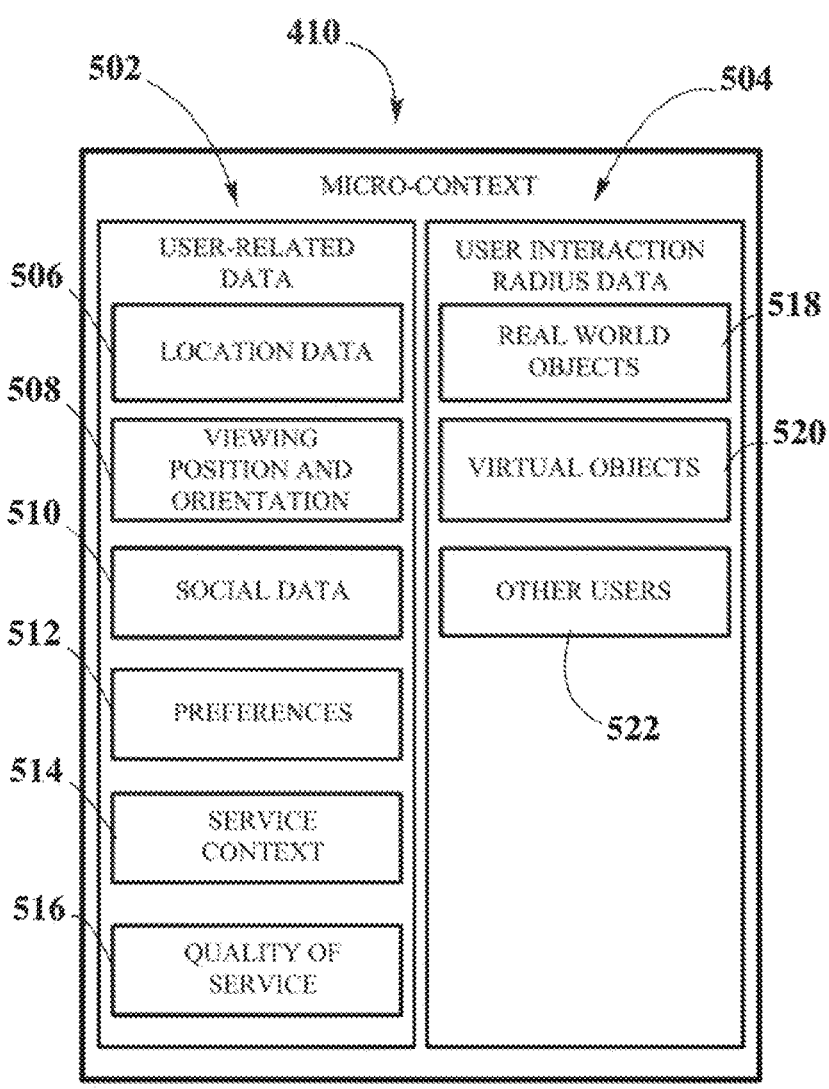
FIG. 5 depicts a schematic representation of micro-context parameters of a data relevance filter, according to an embodiment.

FIG. 5 depicts a schematic representation of parameters of a micro-context 410 from the data relevance filter, according to an embodiment. Some elements of FIG. 5 may be similar to elements of FIGS. 1-4, and thus similar or identical reference numerals may be used to depict those elements.

In an embodiment, the micro-context 410 comprises user-related data 502 and user interaction radius data 504. The user-related data 502 comprises data related specifically to a user, for example, location data 506; viewing position and orientation 508; social data 510; preferences 512; service context 514; and quality of service 516 specific to the user. The user interaction radius data 504 may be related to a predefined radius of interaction where a user may view and engage with virtual objects within the persistent virtual world system. Thus, the user interaction radius data 504 comprises, for example, real world objects 518 within the user interaction radius, VM-hosted 3D applications, ads, and other virtual objects 520 within the user interaction radius, as well as other users 522 within the user interaction radius. In some embodiments, ads, interactive elements, and virtual replicas are also hosted on their respective VMs.

The user location data 506 and viewing position and orientation 508 may be captured by sensing mechanisms within the user device and may be sent to the server.

The user social data 510 may refer to information regarding the relationship between users, which may enable several features. For example, users may use the persistent virtual world system as a social network where some users may befriend other users. If two users are friends within the social network and they are at a certain distance between each other (e.g., a distance where one user is visible to the other one), certain details, such as the name or other data of the user, may be displayed somewhere near the user in order to facilitate recognition. Other features may include opening a communication channel, such as audiovisual or text, that may enable remote communication between users of the persistent virtual world system.

The user preferences 512 may be related to the type of application that the user may use more frequently, the type of social contacts that the user has, the type of places where the user tends to go, the type of items that the user tends to buy, the type of media content that the user tends to consume, the subjects that interest the user, etc. All of these data can be computed via methods known in the art, such as through machine learning algorithms, and may be used to highlight to the user (e.g., through alert messages or sounds, or highlighting in shiny or more visible colors a specific place or a virtual object such as an application, ad, person, and the like) the content that may attract the user the most.

The service context 514 relates to the application that the actual applications being used by a user or users in the vicinity. As each application consumes network bandwidth and other resources, service context 514 may provide the server with valuable contextual data required to assess provisioning of network signals to each user device. The service context 514 also relates to whether a user is viewing the persistent virtual world system in augmented reality or virtual reality.

The quality of service 516 relates to the measurement of the overall performance of the network services being received by a user. Aspects of the services such as packet loss, bit rate, throughput, transmission delay, availability, and jitter, for example, may be used.

The real world objects 518 within the user interaction radius are elements found in the real world, which may be moving or static entities including human beings, vehicles, buildings, objects, recreation areas, natural formations, and streets, amongst others. The real world objects 518 may affect the interaction between the real world objects 518 and virtual objects within the real world system and thus the data computing, rendering, and provisioning.

The virtual objects 520 within the user interaction radius are all VM-hosted 3D applications, ads, and other elements that may be configured within the user interaction radius.

Data related to other users 522 within the user interaction radius may include the other users' service context and QOS, or social data of the other users, which may also affect the data computing and provisioning within the persistent virtual world system.

In an embodiment, all of the data captured through the micro-context is used by the data relevance filter to determine an adequate filtering and optimization of the computing, rendering, and data provisioning to users. Alternatively, less than all of the captured data can be used, in any combination.

Figure 6:
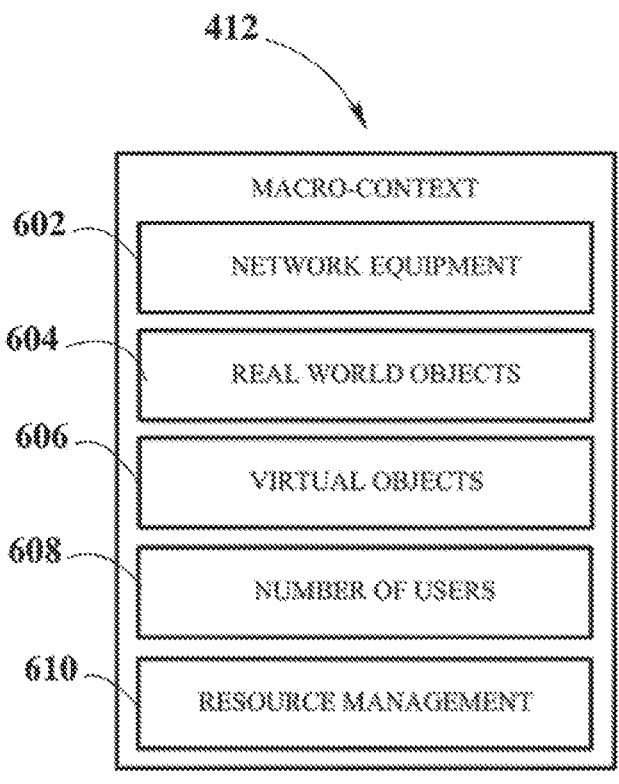
FIG. 6 depicts a schematic representation of macro-context parameters of a data relevance filter, according to an embodiment.

FIG. 6 depicts a schematic representation of parameters of a macro-context 412 from the data relevance filter, according to an embodiment. Some elements of FIG. 6 may be similar to elements of FIGS. 1-5, and thus similar or identical reference numerals may be used to depict those elements.

The macro-context 412 comprises data related to elements in a predefined area. The predefined area may be determined within the persistent virtual world system as a combination of micro-contexts in a specified geographical area. The macro-context 412 may comprise holistic information of a system including current efficiency of a manufacturing plant, air quality, climate change levels, company efficiency, city efficiency, country efficiency, and worldwide efficiency, amongst others.

The macro-context 412 comprises, for example, network equipment 602 in a predefined area surrounding the location of the VM-hosted 3D applications or virtual objects; real world objects 604 in the predefined area; virtual objects 606 in the predefined area; the number of users 608 in the predefined area; and resource management 610 for the predefined area. In further embodiments, the macro-context 412 comprises holistic information of a system including current efficiency of a manufacturing plant, air quality, climate change levels, company efficiency, city efficiency, country efficiency, and worldwide efficiency. The macro-context 412 may use the data of a plurality of micro-contexts in order to optimize the data computing, rendering, and provisioning to each user device while keeping the overall efficiency of the persistent virtual world system at suitable, predetermined levels. The macro-context 412 may be particularly used during load balancing 420 described with reference to FIG. 4.

The network equipment 602 within a predefined area may be characterized by the number and location of servers and network antennas in the area. The data relevance filter of the server may calculate the distance between each user requiring network-data and the respective network antennas and data centers required for data provisioning, and may thereafter select the network antennas and data centers that can best provision the user with data and resources.

The real world objects 604 are elements found in the real world may be moving or static entities found in the real world, including human beings, vehicles, buildings, objects, recreation areas, natural formations, and streets, amongst others, which may affect the interaction between the real world objects 604 and virtual objects within the real world system and thus the resource provisioning. The virtual objects are all VM-hosted 3D applications, ads, and other elements that may be configured within the predefined area.

The number of users 608 within the predefined area is also a factor when optimizing the data computing, rendering, and provisioning, as the number of users 608 may influence the quality of service in the system due to the bandwidth consumed per user device.

Resource management 610 refers to the management of resources, which may include resources such as energy, water, pollution, as well as computing resources such as network bandwidth. For example, if the persistent virtual world system is used to manage energy resources in a neighborhood, district, or city, the system may try to keep the energy efficiency as high as possible and may remind home owners to turn off unnecessary lights or artifacts. Some of this information may be displayed within the persistent virtual world system to users, having an effect in the data computing, rendering, and provisioning to users. Similar principles may apply to other types of resource management 610, where the system may modify a plurality of aspects within the persistent virtual world system in order to keep resource efficiency high, providing the corresponding real-time changes to users.

Figure 7:
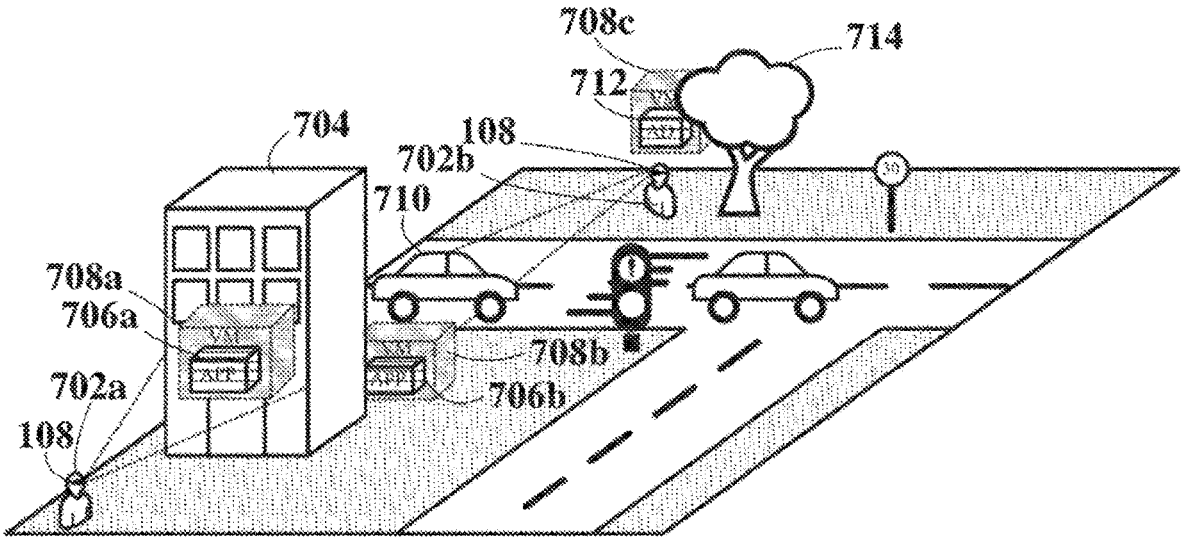
FIG. 7 depicts a schematic representation of a sample neighborhood scenario depicting real world objects and virtual objects, comprising applications hosted on positional virtual machines, according to an embodiment.

FIG. 7 depicts a schematic representation of a sample neighborhood scenario depicting real world objects and virtual objects, comprising applications hosted on positional virtual machines, according to an embodiment. Some elements of FIG. 7 may be similar to elements of FIGS. 1-6, and thus similar or identical reference numerals may be used to depict those elements.

Making reference to the example of FIG. 7, two users 702a-b wearing user devices 108 are looking at different directions comprising several real world objects and virtual objects.

User 702*a*, for example, may be able to view a building 704, and view, hear, and interact with an application 706*a* hosted on a VM 708*a*. However, because the 3D data structure of the building 704 is stored in the persistent virtual world system, application 706*b*, a vehicle 710 and an ad 712, may all be occluded by the building 704 and thus may not be visible to user 702*a*, increasing efficiency of the resource provisioning to user device 108. The user 702*a* may, on the other hand, hear any sounds emitted from application 706*b* hosted on VM 708*b* and ad 712 hosted on VM 708*c*, making the user 702*a* aware of the presence of such virtual objects.

User 702*b* may be looking at an opposite direction than user 702*a*, and thus may be able to view and hear the ad 712 and the application 706*b* but, may only be able to hear any sounds emitted from the application 706*a* without being able to view the application 706*a*. Furthermore, user 702*b* may not be able to view the ad 712, which may be partially occluded by a tree 714, but may be able to hear it louder than the application 706*b*.

Figure 8:
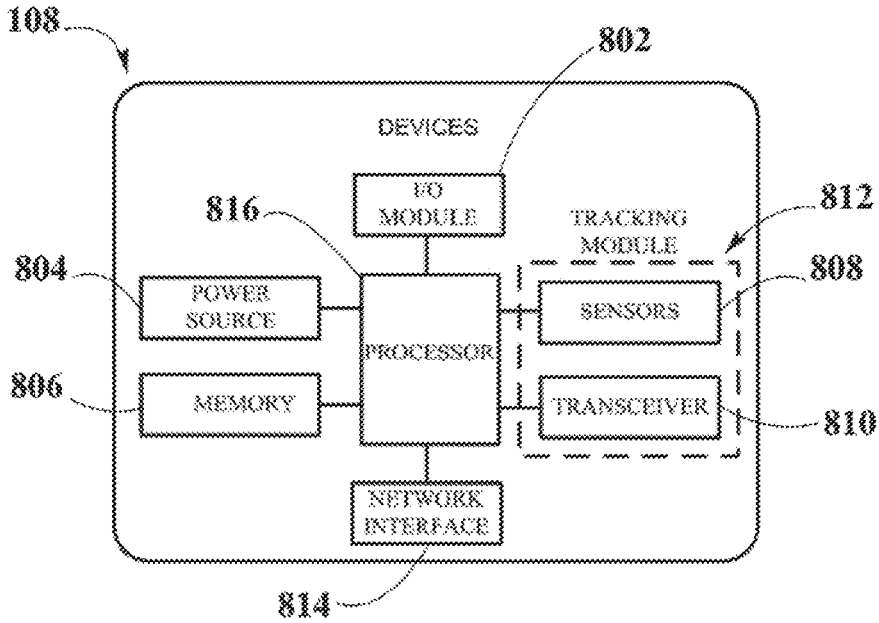
FIG. 8 depicts a schematic representation of a device, according to an embodiment.

FIG. 8 depicts a schematic representation of a user device 108, according to an embodiment. Some elements of FIG. 8 may be similar to elements of FIG. 1-7, and thus similar or identical reference numerals may be used to depict those elements.

A user device 108 of the current disclosure may include operational components such as an input/output (I/O) module 802; a power source 804; a memory 806; sensing mechanisms 808 and transceivers 810 forming a tracking module 812; and a network interface 814, all operatively connected to a processor 816.

The I/O module 802 is implemented as computing hardware and software configured to interact with users and provide user input data to one or more other system components. For example, I/O module 802 may be configured to interact with users, generate user input data based on the interaction, and provide the user input data to the processor 816 before being transferred to other processing systems via a network, such as to a server. In another example, I/O modules 802 is implemented as an external computing pointing device (e.g., a touch screen, mouse, 3D control, joystick, gamepad, and the like) and/or text entry device (e.g., a keyboard, dictation tool, and the like) configured to interact with user device 108. In yet other embodiments, I/O module 802 may provide additional, fewer, or different functionality to that described above.

The power source 804 is implemented as computing hardware and software configured to provide power to the user device 108. In one embodiment, the power source 804 may be a battery. The power source 804 may be built into the user device 108 or removable from the user device 108, and may be rechargeable or non-rechargeable. In one embodiment, the user device 108 may be repowered by replacing one power source 804 with another power source 804. In another embodiment, the power source 804 may be recharged by a cable attached to a charging source, such as a universal serial bus ("USB") FireWire, Ethernet, Thunderbolt, or headphone cable, attached to a personal computer. In yet another embodiment, the power source 804 may be recharged by inductive charging, wherein an electromagnetic field is used to transfer energy from an inductive charger to the power source 804 when the two are brought in close proximity, but need not be plugged into one another via a cable. In another embodiment, a docking station may be used to facilitate charging.

The memory 806 may be implemented as computing hardware and software adapted to store application program instructions and to store data (e.g., sensor data) captured by the plurality of sensing mechanisms 808. The memory 806 may be of any suitable type capable of storing information accessible by the processor 816, including a computer-readable medium, or other medium that stores data that may be read with the aid of an electronic device, such as a hard-drive, memory card, flash drive, ROM, RAM, DVD or other optical disks, as well as other write-capable and read-only memories. The memory 806 may include temporary storage in addition to persistent storage.

The sensing mechanisms 808 may be implemented as computing hardware and software adapted to obtain various data from the real world and determine/track the position and orientation of the user device 108. The sensing mechanisms 808 may include, without limitations, one or more include one or more temperature sensors, proximity sensors, inertial sensors, infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. In particular, the sensing mechanisms 808 include one or more Inertia Measuring Units (IMUs), accelerometers, and gyroscopes. The IMU is configured to measure and report the velocity, acceleration, angular momentum, speed of translation, speed of rotation, and other telemetry metadata of user device 108 by using a combination of accelerometers and gyroscopes. Accelerometers within the IMU and/or configured separate from the IMU may be configured to measure the acceleration of the interaction device, including the acceleration due to the Earth's gravitational field. In one embodiment, accelerometers include a tri-axial accelerometer that is capable of measuring acceleration in three orthogonal directions.

The transceivers 810 may be implemented as computing hardware and software configured to enable user device 108 to receive wireless radio waves from antennas and to send the data back to the antennas. In some embodiments, mmW transceivers may be employed, which may be configured to receive mmW wave signals from antennas and to send the data back to antennas when interacting with immersive content. The transceiver 810 may be a two-way communication transceiver 810.

In an embodiment, the tracking module 812 may be implemented by combining the capabilities of the IMU, accelerometers, and gyroscopes with the positional tracking provided by the transceivers 810 and the accurate tracking, low-latency and high QOS functionalities provided by mmW-based antennas may enable sub-centimeter or sub-millimeter positional and orientational tracking, which may increase accuracy when tracking the real-time position and orientation of user device 108. In alternative embodiments, the sensing mechanisms 808 and transceivers 810 may be coupled together in a single tracking module device.

The network interface 814 may be implemented as computing software and hardware to communicatively connect to a network, receive computer readable program instructions from the network sent by the server or by user device 108, and forward the computer readable program instructions for storage in the memory 806 for execution by the processor 816.

The processor 816 may be implemented as computing hardware and software configured to receive and process data. For example, the processor 816 may be configured to provide imaging requests, receive imaging data, process imaging data into environment or other data, process user input data and/or imaging data to generate user interaction data, perform edge-based (on-device) machine learning training and inference, provide server requests, receive server responses, and/or provide user interaction data, environment data, and content object data to one or more other system components. For example, the processor 816 may receive user input data from I/O module 802 and may respectively implement application programs stored in the memory 806. In other examples, the processor 816 may receive data from sensing mechanisms 808 captured from the real world, or may receive an accurate position and orientation of user device 108 through the tracking module 812, and may prepare some of the data before sending the data to a server for further processing. As way of example, the processor 816 may realize some of the steps required during data preparation including analog or digital signal processing algorithms such as raw data reduction or filtering of data before sending the data to a server.

FIG. 9 depicts a block diagram of a method 900 to operate 3D applications through virtualization technology, according to an embodiment. Method 900 may be implemented in systems such as described with reference to FIGS. 1-8.

According to an embodiment, the method 900 to operate 3D applications through virtualization technologies begins in step 902 by providing in the memory of at least one server a persistent virtual world system comprising a data structure in which at least one virtual replica of at least one corresponding real object is represented. The method 900 continues in step 904 by providing in the memory of the at least one server at least one application run and hosted on one or more virtual machines virtually positioned in a location of the persistent virtual world system, the applications being interacted by one or more user devices connected to the at least one server via a network. In step 906, the method continues by providing the at least one virtual machine with resources from the at least one server allocated based on the requirements of the at least one application. The method may end in step 908 by managing the provisioning of the virtual machines by a virtual machine management system stored in the memory of the server, wherein the management is based on a distance prioritization parameter taking into account the distance of user devices to the at least one virtual machine.

According to an embodiment, managing the provisioning of the virtual machines by a virtual machine management system further comprises the steps of performing a resource requirement assessment by the global VM manager; and allocating the resources to the one or more virtual machines by the global VM manager.

According to an embodiment, managing the provisioning of the virtual machines is further based on a data relevance filter that takes into account contextual data, 3D data structure of virtual elements, and other techniques, such as scene graphs, level of detail (LOD) management, preparation for rendering stages, load balancing, and VM migration, amongst others.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

The invention claimed is:

1. A system to operate applications through virtualization technologies, the system comprising:

one or more servers storing a virtual world system comprising a data structure in which at least one virtual replica of at least one corresponding real-world object is represented, at least one application run and hosted on at least one virtual machine, the one or more servers comprising hardware infrastructure providing the at least one virtual machine with resources allocated based on requirements of the at least one application, and a virtual machine management system stored in the memory of one or more servers for managing provisioning of computing resources to the at least one virtual machine based on contextual data, wherein the virtual machine management system uses level of detail (LOD) management to modify a complexity of a 3D model representation of the at least one virtual replica and to optimize the management of provisioning of computing resources.

2. The system of claim 1, wherein the virtual machine management system comprises a global virtual machine manager performing virtual machine resource requirement assessment and provisioning through a hypervisor interfacing with the at least one virtual machine.

3. The system of claim 2, wherein the global virtual machine manager is part of a 3D engine that enables development, testing, and publishing of virtual-machine-hosted 3D applications in the persistent virtual world system, wherein the 3D applications are linked to one or more real-world locations.

4. The system of claim 2, wherein the virtual machine management system further comprises a local virtual machine manager connected to the global virtual machine manager and configured to provide the global virtual machine manager with a resource assessment of the at least one virtual machine, the local virtual machine manager comprising a monitoring component measuring virtual machine resource utilization.

5. The system of claim 1, wherein the contextual data further comprises a micro-context and macro-context, the micro-context comprising the user-related data and user interaction radius data, and the macro-context is determined in a predefined area and comprises network equipment, the at least one real-world object, virtual objects, number of users, or resource management, or a combination thereof.

6. The system of claim 5, wherein the macro-context further comprises data related to the one or more servers in a predetermined area, the at least one real-world object in the predetermined area, the number of users in the predetermined area, applications, ads, or other virtual objects in the predetermined area, or resource management for the predetermined area, or a combination thereof.

7. The system of claim 1, wherein the contextual data includes user-related data, and the user-related data further comprises at least one of user social data, user preferences, user service context.

8. The system of claim 1, wherein the at least one application comprises a 3D application.

9. The system of claim 1, wherein the at least one virtual machine hosts virtual objects comprising ads, interactive elements, and virtual replicas.

10. The system of claim 1, wherein the LOD management modifies the complexity of the 3D model representation by associating a model having a higher or lower level of fidelity.

11. The system of claim 10, wherein the LOD management further modifies the complexity of the 3D model representation based on distance of the 3D model representation from a user, importance, viewpoint-relative speed, or position in the virtual world.

12. A method to operate applications through virtualization technologies, the method comprising:

providing, in memory of a server system comprising one or more servers, a virtual world system comprising a data structure in which at least one virtual replica of at least one corresponding real-world object is represented;

providing in the memory of the server system a virtual machine management system and at least one application run and hosted on at least one virtual machine, the at least one application being interacted with by a user device connected to the server system via a network;

providing the at least one virtual machine with resources from the server system allocated based on requirements of the at least one application; and managing provisioning of computing resources to the at least one virtual machine based on contextual data; and optimizing the management of the provisioning of computing resources by modifying a complexity of a 3D model representation of the at least one virtual replica using level of detail (LOD) management.

13. The method of claim 12, wherein managing the provisioning of the computing resources to the at least one virtual machine by the virtual machine management system is based on a distance prioritization parameter.

14. The method of claim 13, wherein the distance prioritization parameter takes into account a distance of the user device to a physical location of the at least one virtual machine linked to real-world coordinates.

15. The method of claim 12, wherein the virtual machine management system comprises a global virtual machine manager performing virtual machine resource requirement assessment and provisioning through a hypervisor interfacing with the at least one virtual machine.

16. The method of claim 15, wherein the global virtual machine manager is part of a 3D engine that enables development, testing, and publishing of VM-hosted 3D applications in the persistent virtual world system linked to a real-world location.

17. The method of claim 12, wherein the virtual machine management system comprises a local virtual machine manager connected to a global virtual machine manager and configured to provide the global virtual machine manager with a resource assessment of the at least one virtual machine, the local virtual machine manager comprising a monitoring component measuring virtual machine resource utilization, a feedback controller configured to determine required resource allocations for the at least one virtual machine, and an arbitrator obtaining resource allocation requests from the feedback controller and sets resource shares for the at least one virtual machine.

18. The method of claim 12, wherein managing the provisioning of the at least one virtual machine by the virtual machine management system comprises:

performing a resource requirement assessment by a global virtual machine manager; and allocating the resources to the at least one virtual machine by the global virtual machine manager.

19. The method of claim 12, wherein the contextual data includes user-related data, and the user-related data further includes at least one of user social data, user preferences, or user service context.

20. The method of claim 12, wherein modifying the complexity of the 3D model representation comprises adjusting the level of detail by associating a model having a higher or lower level of fidelity.

21. The method of claim 20, wherein the modifying the complexity of the 3D model representation is based on distance of the 3D model representation from a user, importance, viewpoint-relative speed, or position in the virtual world.

22. One or more non-transitory computer-readable media having stored thereon instructions configured to, when executed by one or more computers, cause the one or more computers to:

provide a persistent virtual world system comprising a data structure in which at least one virtual replica of at least one corresponding real-world object is represented;

provide at least one 3D application run and hosted on at least one virtual machine virtually positioned in the persistent virtual world system, the at least one 3D application configured to be interacted with by a user device;

provide the at least one virtual machine with resources from at least one server allocated based on requirements of the at least one 3D application;

manage provisioning of computing resources to the at least one virtual machine based on contextual data; and optimizing the management of the provisioning of computing resources by modifying a complexity of a 3D model representation of the at least one virtual replica using level of detail (LOD) management.

23. The non-transitory computer-readable media of claim 22, wherein the contextual data included user-related data, and the user-related data further comprises at least one of user social data, user preferences, or user service context.

24. The non-transitory computer-readable media of claim 22, wherein modifying the complexity of the 3D model representation comprises adjusting the level of detail by associating a model having a higher or lower level of fidelity.

25. The non-transitory computer-readable media of claim 24, wherein modifying the complexity of the 3D model representation is based on distance of the 3D model representation from a user, importance, viewpoint-relative speed, or position in the virtual world.

* * * * *